United States Patent
Agarwal

(10) Patent No.: US 12,373,129 B2
(45) Date of Patent: Jul. 29, 2025

(54) ENCODING AND COMPRESSING BITS WITH WRITE-X FEATURE IN MEMORY SYSTEM

(71) Applicant: Micron Technology, Inc., Boise, ID (US)

(72) Inventor: Nikesh Agarwal, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/349,053

(22) Filed: Jul. 7, 2023

(65) Prior Publication Data

US 2024/0184477 A1 Jun. 6, 2024

Related U.S. Application Data

(60) Provisional application No. 63/430,321, filed on Dec. 5, 2022.

(51) Int. Cl.
*G06F 3/06* (2006.01)

(52) U.S. Cl.
CPC .......... *G06F 3/0655* (2013.01); *G06F 3/0604* (2013.01); *G06F 3/0673* (2013.01)

(58) Field of Classification Search
CPC ..... G06F 3/0604; G06F 3/0655; G06F 3/0673
See application file for complete search history.

(56) References Cited

U.S. PATENT DOCUMENTS

2017/0250708 A1* 8/2017 Blaettler ............... G06F 3/0673
2022/0197506 A1* 6/2022 Blagodurov ........ G06F 12/0246

* cited by examiner

*Primary Examiner* — Aracelis Ruiz

(57) ABSTRACT

In a computer host system, a system and method to compress the transmission between the central processing unit (CPU) and the dynamic random access memory (DRAM) of either of an extended consecutive series of '0' bits or an extended consecutive series of '1' bits. The CPU or a Compute Express Link (CXL) Initiator associated with the CPU identifies the consecutive strings of '0' bits or '1' bits. The CPU or the CXL Initiator sets data flags in a FLIT data structure, using just two bits or four bits to indicate the strings. The data structure is sent to a CXL memory, which interprets the flags and constructs the extended series of '0' bits or extended series of '1' bits.

14 Claims, 9 Drawing Sheets

Exemplary Constructed Data

Constructed by CXL Drive

FIG. 3B

ENCODING AND COMPRESSING BITS WITH WRITE-X FEATURE IN MEMORY SYSTEM

CROSS REFERENCE TO RELATED APPLICATIONS

This application claims benefit to U.S. Provisional Patent Application No. 63/430,321, filed Dec. 5, 2022, and entitled "Write-X Feature in CXL," the disclosure of which is incorporated herein in its entirety by reference.

TECHNICAL FIELD

The following relates generally to one or more systems for memory. It relates, in particular, to compressing data in data packets transferred between a central processing unit (CPU) and dynamic random access memory (DRAM).

BACKGROUND

Memory devices (also referred to as memory media devices) are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic '1' or a logic '0'. To access information stored by a memory device, a component may read, or sense, the state of one or more memory cells within the memory device. To store information, a component such as a central processing unit (CPU) may write, or program, one or more memory cells within the memory device to corresponding states.

In compute express link (CXL) memory systems, data is sent back and forth between the CPU and DRAM in data structures (or "data packages") called FLITs (Flow Control UnITs). A FLIT may include both instructional messages and data, and describes messages sent across the cache/memory protocol interface (CPI) that generally express the amount of data passed on in one clock cycle on a CPI physical channel. A FLIT may also include various control signals and flags.

Studies show that approximately 30% of all write requests to memory are composed of either all '0's or all '1's. More specifically, studies show that memory bound server workloads has 5%-40% memory traffic as data initialization traffic (which writes to memory locations with all '0's). 10% to 80% of memory bound traffic is either due to data copy or data initialization operations. This increases bandwidth demand by unnecessarily sending all '0' data to downstream memory devices. The performance cost of zero initialization is quite high—up to 12.7% on virtual machines with IA32 architecture.

This is expected to put significant performance pressure on the CPU-to-DRAM CXL Link which is already oversubscribed. When a memory is connected over a CXL Link, each write request consumes about 5 slots in the FLIT (one for the header and four for data). This can at times leave little or no space to accommodate a read request in a FLIT; this in turn increases the latency of read requests, as reads can be stuck behind writes and saturate the downstream link (from CPU to DRAM) with write data having all 0's or 1's.

What is desired is a system and method to pack more write data in a FLIT, so some of the five slots can be used to accommodate a read request.

BRIEF DESCRIPTION OF THE DRAWINGS

Advantageous designs of embodiment of the present disclosure result from independent and dependent claims, the description, and the drawing. In the following, preferred examples of embodiments of the disclosure are explained in detail with the aid of the attached drawings. The drawings, which are incorporated herein and form part of the specification, illustrate the present disclosure. Together with the description the drawings further serve to explain the principles of the disclosure, and to enable a person skilled in the relevant art(s) to make use of the disclosure.

FIG. 3B represents exemplary resulting data which is reconstructed by the central controller of the CXL drive based on the first CXL FLIT header of FIG. 3A.

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

It will be noted that while binary digits are referred to in this description as '0's and '1's, they are referred to in the appended claims as "zeroes" and "ones", respectively.

Figure 1:
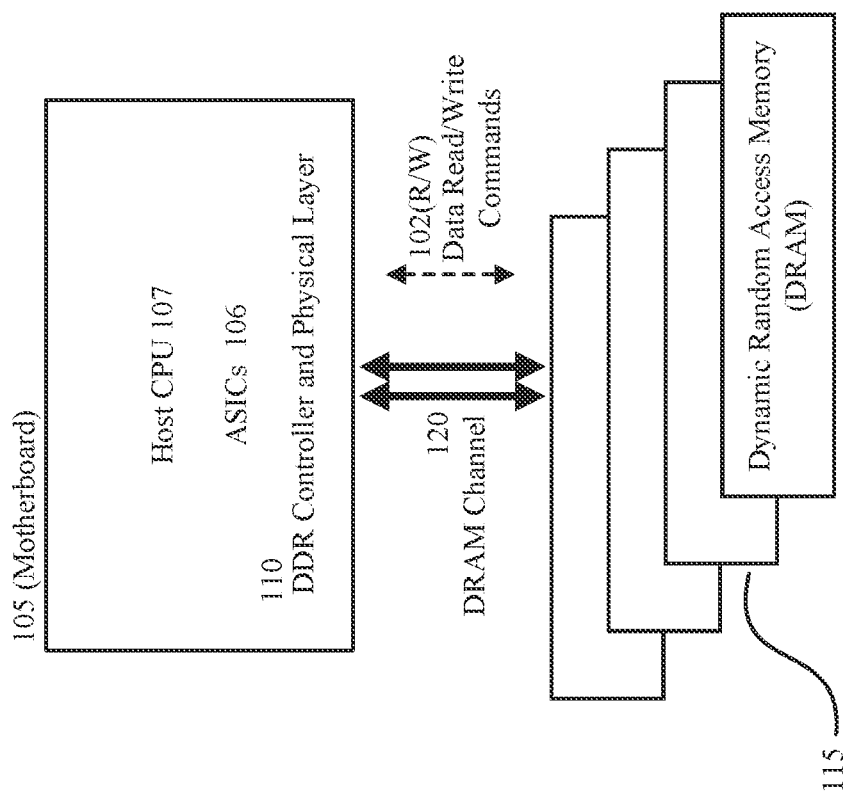
FIG. 1 illustrates a diagrammatic modular depiction of an exemplary legacy host computer system.

FIG. 1 illustrates a diagrammatic modular depiction of an exemplary legacy host computer system 100. The computer system 100 includes an motherboard 105 which has a host CPU 107 and various application specific integrated circuits (ASICs) not shown in the figure but known in the arts. In the ordinary, routine course of computer operations the CPU 107 will generate streams of digital data 202, such as the digital data 202 (see FIG. 2). The digital data streams 202 may be generated by a user application 201 (or in some cases an operating system module or drive) running on the CPU 107; and the digital data streams 202 may be based on a wide variety of data sources well known in the art. These data sources may include, for example and without limitation: data copy operations, data initialization operations (which often entail setting regions of memory to all '0's or all '1's), database information, text, audio, video, raw or processed signal data, or the results of calculations. Typically, at least some of the data is intended for storage in DRAM 115, and is sent in the form of write commands 102W. The CPU 107 may also generate requests for data (read commands) 102R.

The motherboard 105 may also include various data buses, including DRAM channel 120 (i.e., CXL linker), physical ports, and expansion slots not shown in the figure. The motherboard 105 may also include slots for insertion and communicative coupling of the DRAM 115 shown elsewhere in the figure. Among the ASICs on the motherboard 105 may be a DDR Controller and Physical Layer 110 (sometimes referred to as the "Phy"), that provide for direct data communications between the host CPU 107, and for direct read/write (R/W) commands 102 of the DRAM 115 by the host CPU 107. The direct data communications and the R/W commands 102 may occur via the CXL linker 120.

Figure 2:
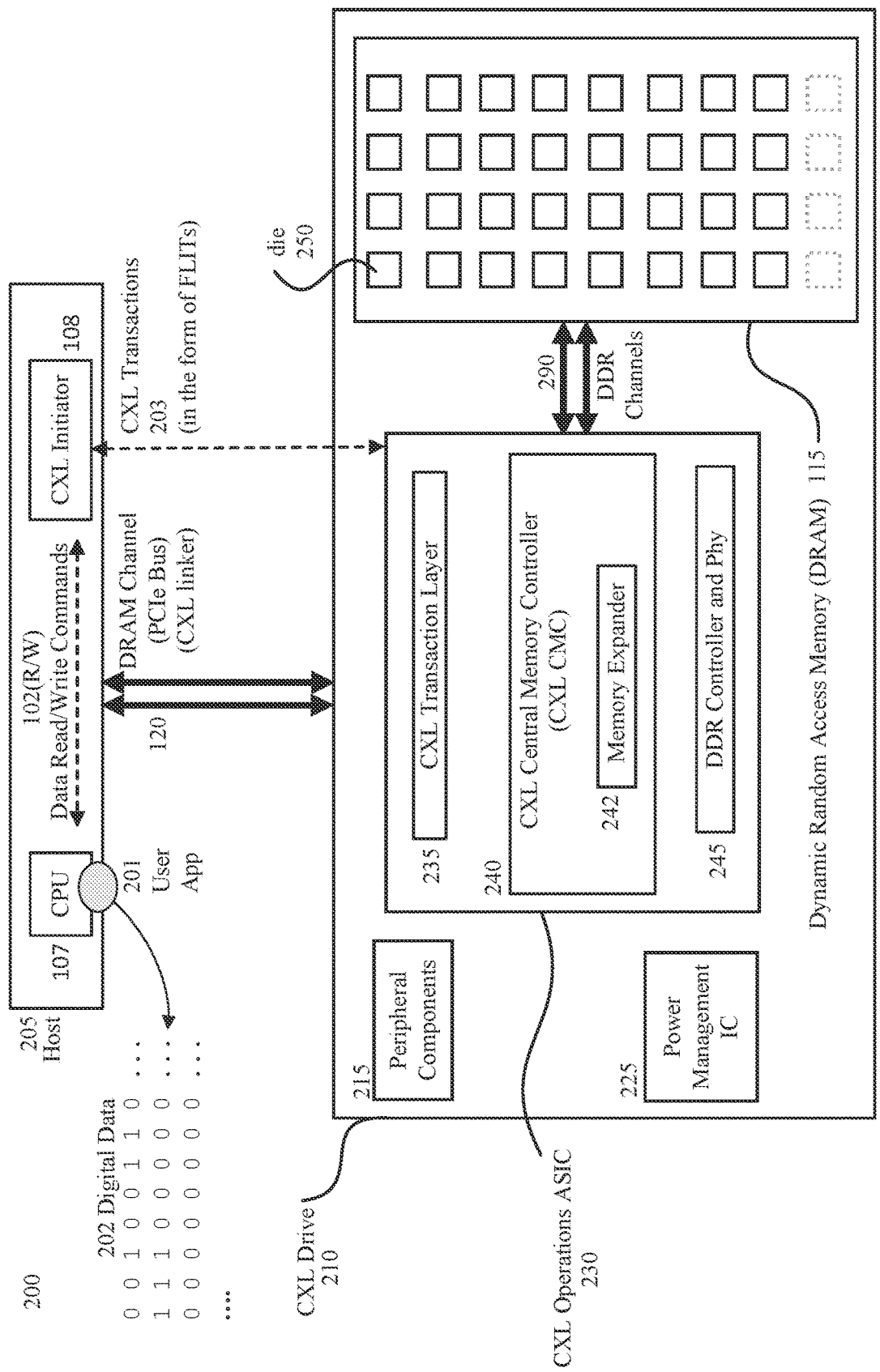
FIG. 2 illustrates a diagrammatic modular depiction of an exemplary host computer system which includes CXL technology.

FIG. 2 illustrates a diagrammatic modular depiction of an exemplary host computer system 200 which includes CXL technology. CXL is an open standard, cache-coherent interconnect for processors, memory, and memory expansion. CXL is defined by a series of commands and required memory command responses defined in a specification created by the Joint Electron Device Engineering Council (JEDEC) Solid State Technology Association and the CXL Consortium.

CXL technology maintains memory coherency between memory space of a host CPU 107 and DRAM 115 on attached devices. The motherboard 205 and the CPU 107 in combination may be referred to in the art as simply "the host device," and may have memory in addition to the CXL drive 210.

A host device 205 is a source of data write commands 102W and data read requests 102R. More specifically, the CPU 107 generates data read/write commands 102R/W. A CXL initiator module 108 packages these commands 102R/W in CXL data packets in CXL transactions 202 which are fixed-width flow control units (FLITS) (see FIGS. 3A, 4A, and 5A).

It will be noted that in FIG. 2 the CXL initiator 208 is depicted as a separate hardware module on the motherboard 205. This is for convenience of exposition only. In some embodiments of the present disclosure, the CXL initiator 208 may be a software module or firmware running on the CPU 107.

The CXL linker 120, which may for example be a Peripheral Connect Interface express bus (PCIe Bus) is the hardware medium which communicates CXL transactions 202 from host device's 205 CXL initiator 208 from/to the CXL drive 210. The CXL drive 210 may be composed of multiple ASICs mounted to a shared board, or may be a single ASIC with multiple sub-modules. In general, the CXL drive 210 reads and writes data from/to DRAM memory 115 (composed of multiple die 205), or other kinds of suitable data storage, responsive to data requests from the host CPU 107.

The host device 205 of computer system 200 also may include physical ports and expansion slots not shown in the figure. The motherboard may have mounted on board, or include slots (not shown) for the insertion of the CXL drive 210. As discussed throughout this document, the CXL drive 210 serves as a mediator and controller between the CPU 107 and the DRAM 115. The CXL Linker 120 is used to digitally ferry CXL transaction commands 202 between the host CPU 107 and the CXL drive 210. The motherboard may also include slots (not shown) for insertion and communicative coupling of the DRAM 115 shown elsewhere in the figure. In turn, the CXL drive 210 and the DRAM 115 are typically coupled via double data rate (DDR) channels 290, which may themselves be integrated into the motherboard.

The CXL drive 210 may itself include an exemplary CXL Operations ASIC 230. The CXL Operations ASIC 230 may itself include a CXL transaction layer 235 configured to provide data interfacing for CXL transactions 202, and thereby for data R/W commands 102, to/from the host CPU 107. Unlike conventional main memory, where the CPU 107 makes transactions to DRAM 115 through the CXL linker 120, a CXL drive 210 will have one or more ASICs to intercept CXL transactions 202, made through the CXL drive 210, and convert them to DRAM transactions. One function of the CXL operations ASIC 230 in a CXL drive 210 is to convert CXL transactions 202 to DRAM requests.

The CXL operations ASIC 230 may also include a CXL central memory controller (CXL CMC) 240 and a DDR Controller and Physical Layer 245. The motherboard 105 may be directly connected to CXL Operations ASIC 230 via CXL linker 120. The DDR controller and physical layer 245 may operate similarly to the DDR controller and physical layer 110 of computer system 100 interfacing with the DRAM 115, as discussed above. Similarly, the CXL Operations ASIC 230 may be directly connected to DRAM 115 via DDR channels 290. Specifically, the CXL CMC 240 is communicatively coupled with the DRAM 115.

The CXL Operations ASIC 230 may have logic blocks (not shown, but which may be part of CXL CMC 240) to perform additional tasks such as error correction, thermal management, media management, etc.

The CXL CMC 240 may include a Memory Expander module 242 which, as explained further below, generates multiple consecutive bytes of all '0's or all '1's (that is, identical bits) based on operational codes in a CXL header. The operations of the CXL CMC 240 are discussed further below in this document.

The CXL drive 210 may additionally include a variety of peripheral components 215 the details of which are beyond the scope of this document and a power management integrated circuit (IC) 225.

Some further details regarding an exemplary CLX drive 210 which may be pertinent to the present disclosure: A CXL Interface based on PCIE 5.0/6.0 comprises of a pair of unidirectional links, each contributing to system bandwidth. CXL2.0 provides an interface which leverages PCIE 5.0 (32 GT/s), while CXL 3.0 leverages PCIE 6.0 (64 GT/s) in each direction.

Multiple requests and data are transported over the CXL Linker as FLITS 300a, 400a, 500a, as described above and further below in this document. The CXL host 205 is responsible for generating requests to the CXL drive 210. The CXL drive 210 has a CXL CMC 240 which unpackages (that is, decodes) the FLIT request incoming from the host and forwards this request to the backend media (that is, the DRAM) 115. The unpackaging or decoding may be performed by a Memory Expander module 242 of the CXL CMC 240.

Each FLIT in CXL 2.0 is of 528 bits (divided into 4 slots each of 16B+2 Bytes for cyclic redundancy check (CRC)), totaling 66 bytes or 528 bits. Each FLIT in CXL 3.0 is of 256 bytes (divided into 16 slots each of 16 bytes each) where 238 bytes in each FLIT is for a transaction layer packet (TLP) payload and 18 bytes are for CRC and forward error correction (FEC). Fifteen out of the sixteen slots can be used for multiple requests and data.

When a CPU 107 issues a write command 102W on a CXL Linker 120, it checks for data credits. If one or more data credits are available, the CPU 107 issues a write request (RwD) over one slot and sixty-four bytes of data over four slots. Each RwD consumes 5 slots both in CXL 2.0 (multiple FLITs) and CXL 3.0 (single or multiple FLITs).

As indicated above, studies show that approximately 30% of write requests to DRAM 115 are either all consecutive 0's or all consecutive 1's (that is, all identical bits). When a DRAM 115 memory is connected over the CXL Linker 120, each write request consumes five slots (one for the header and four for data). This can at times leave little or no space to accommodate a read request in a FLIT, and it increases the latency of read requests (as reads can be stuck behind writes and saturate the downstream link with write data having all identical bits ('0's or '1's)).

The present disclosure addresses this limitation.

A write request 102W from the CPU 107 may have a maximum number of bits (for example, 64 bits, 256 bits, or other numbers of bits.) This maximum number of bits also serves as a consecutive bit stream threshold (CBS threshold) value. If there is a write request with data as all '0's or all '1's—for example, all 64 bits are identically '0's or all 64 bits are identically '1's—the present disclosure: (i) sends a write header (RwD) with a Write X Enable Flag 360 (also referred to in the appended claims as a "first data flag") set; and (ii) a Write X bit 365 (also referred to in the appended claims as a "second data flag") set or unset; all without sending the actual data stream 202 over the CXL Linker 120. This method saves multiple slots (for example, four slots) in the FLIT, as no data is sent; in the fields where the data would have been sent; those data fields can be used to accommodate extra read or write requests.

The CXL drive 210 receives the FLIT and decodes the Write Request Header with Write X Enable bit='1' and Write X bit as '1' or '0'. Based on this decoding, the CXL drive 210 recreates the data for that request with all 1's or all 0's and forwards it to the downstream memory device (e.g., DRAM) for committing to the memory.

In a RwD Message Header, the present disclosure uses 2 bits from the reserved area of the RwD Message Header.

Bit 1, or first data flag–Write X Enable='0' indicates feature disabled (and so there is a need to send actual data, that is, there is a need to send a stream of bits with '0's and '1's); Write X Enable='1' indicates feature enabled (no need to send data, the zeros or ones will be constructed by the CXL drive).

Bit 2, or second data flag–Write X=0 indicates data is all '0's, 1 indicates data is all '1's. This flag enables recreating the data on the CXL drive 210.

The present disclosure continues to consume data credits for such Write Requests 102 so that the host does not send too many writes over the CXL Link 120. (This is the typical process to be followed for PCIE credit flow control mechanism.)

Figure 3A:
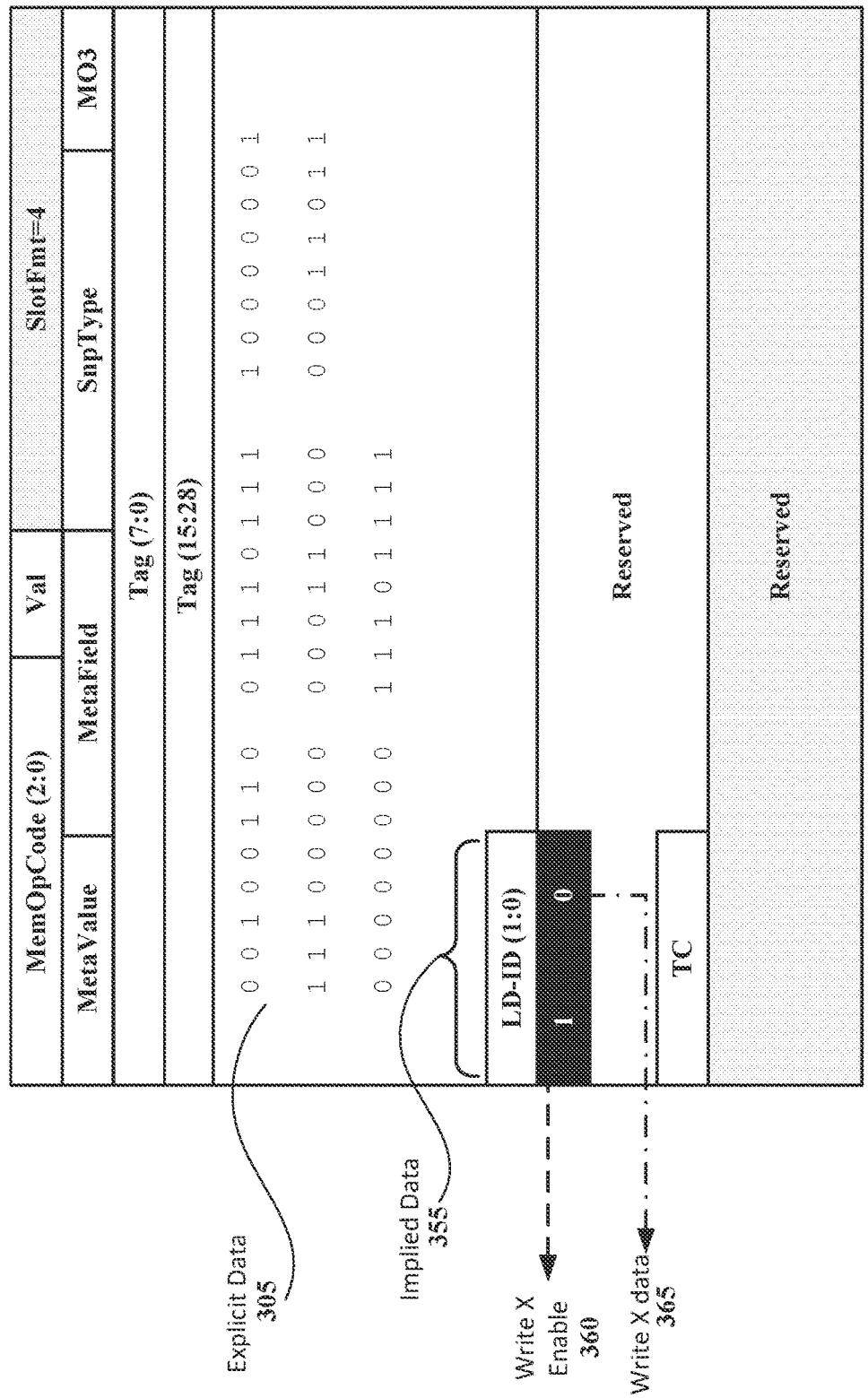
FIG. 3A presents a first exemplary CXL FLIT header according to the present disclosure.

FIG. 3A, presents a first FLIT header 300a according to the present disclosure. It will be noted that the FLIT header 300a is exemplary only, and may not include all the data fields or other elements that may be present in the FLIT header in a CXL host and memory system. (For example, exemplary FLIT header 300a omits a data field for the target memory address.) The FLIT header 300a is prepared and sent by the host CPU 107, possibly in conjunction with the CXL Initiator 208.

In FIG. 3A, the FLIT header 300a includes explicit data 305 which is being sent for writing to memory. The explicit data is placed there by the host CPU 107. The FLIT header 300a also includes implied data 355. The implied data is coded with just two data fields (each data field being just one or two bits in length), a Write X Enabled field 360, and a Write X data field 365. The Write X opcode value of '1' in the Write X Enabled field indicates that the Write X feature is enabled. This opcode of '1' indicates that an entire successive data FLIT is to be understood as being filled with consecutive values of '0' only, or consecutive values of '1' only, without needing to actually send a data stream of identical zeros or identical ones. The value for the consecutive bits—zero or one—is determined by the Write X data field 365. In FIG. 3A, the value of the Write X data field 365, as set by the host CPU 107, is '0'.

FIG. 3B represents exemplary resulting data 350A which is reconstructed by the central controller 240 of the CXL drive 210. The all '0' data 380 is constructed by the central controller, as determined by the Write X Enabled opcode 360 of FLIT header 305a, with the value of '0' being used based on the value '0' found in the Write X field 365 of FLIT header 305a.

The explicit data 305 is the mixed zero/one data that was actually transmitted by the host CPU 107 to the CXL drive 210 across the CXL linker 120. The resulting data full data stream 390 is then stored by the CXL drive 210 in the DRAM 115.

Figure 4A:
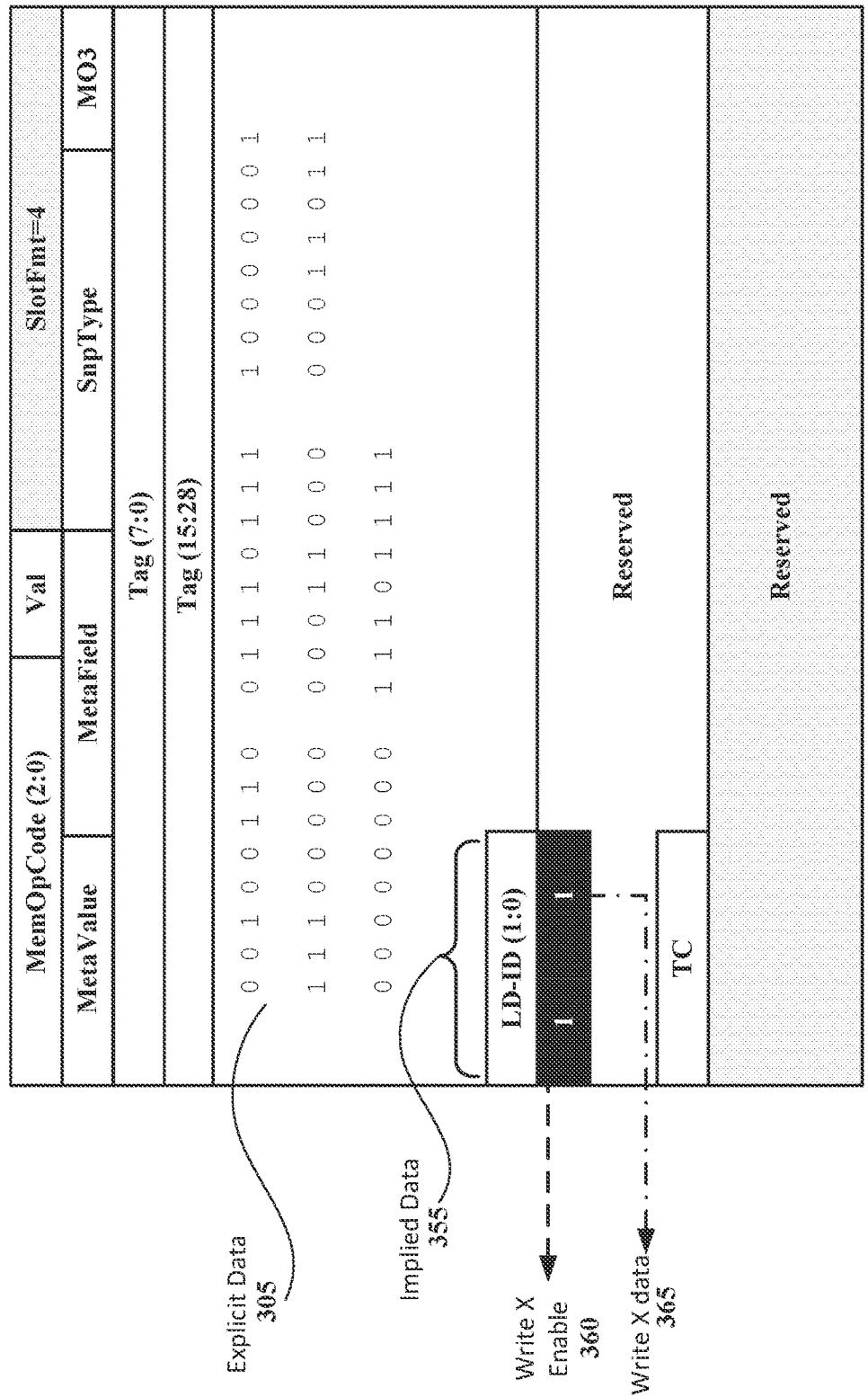
FIG. 4A presents a second exemplary CXL FLIT header according to the present disclosure.

FIG. 4A presents a second FLIT header 400a according to the present disclosure. It will be noted that the FLIT header 400a is exemplary only, and may not include all the data fields or other elements that may be present in the FLIT header in a CXL host and memory system. (For example, exemplary FLIT header 400a omits a data field for the target memory address.) The FLIT header 400a is prepared and sent by the host CPU 107, possibly in conjunction with the CXL Initiator 108.

In FIG. 4A, the FLIT header 400a is substantially similar in most respects to the FLIT header 300a of FIG. 3A. It includes explicit data 305 which is being sent for writing to memory. The explicit data is placed there by the host CPU 107. The FLIT header 400a also includes implied data 355. The implied data may be coded with just two data fields (each data field being just one or two bits in length), a Write X Enabled field 360, and a Write X data field 365. The Write X opcode value of '1' in the Write X Enabled field indicates that the Write X feature is enabled. This opcode of '1' indicates that an entire successive data FLIT is to be understood as being filled with consecutive values of '0' only, or consecutive values of '1' only, without needing to actually send a data stream of zeros or ones. The value for the consecutive bits-zero or one—is determined by the Write X data field 365. In FIG. 4A, the value of the Write X data field 365, as set by the host CPU 107, is '1'.

Figure 4B:
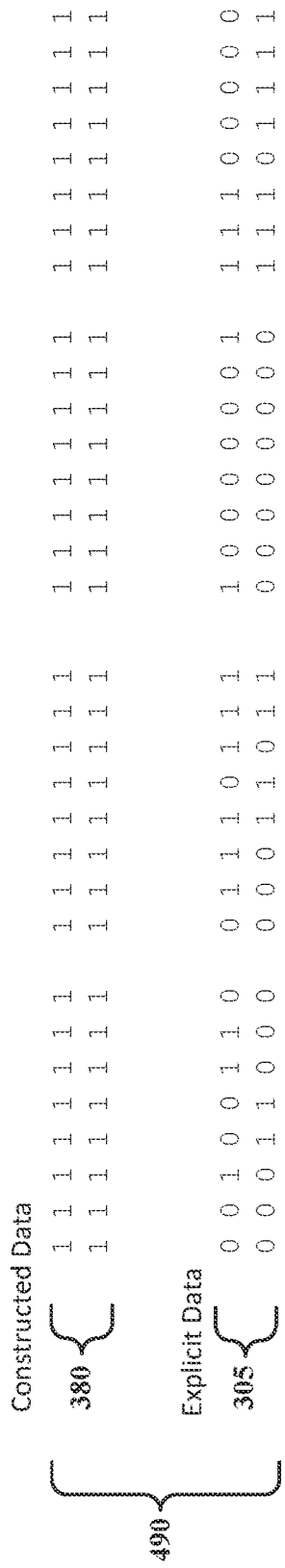
FIG. 4B represents exemplary resulting data which is reconstructed by the central controller of the CXL drive based on the second CXL FLIT header of FIG. 4A.

FIG. 4B represents exemplary resulting data 490 which is reconstructed by the central controller 240 of the CXL drive 210. The all '0' data 380 is constructed by the central controller, as determined by the Write X Enabled opcode 360 of FLIT header 305a, with the value of one being used based on the value '1' found in the Write X field 365 of FLIT header 305a of FLIT 400a.

The explicit data 305 is the mixed zero/one data that was actually transmitted by the host CPU 107 to the CXL drive 210 across the CXL linker 120. The resulting data full data stream 390 is then stored by the CXL drive 210 in the DRAM 115.

Figure 5A:
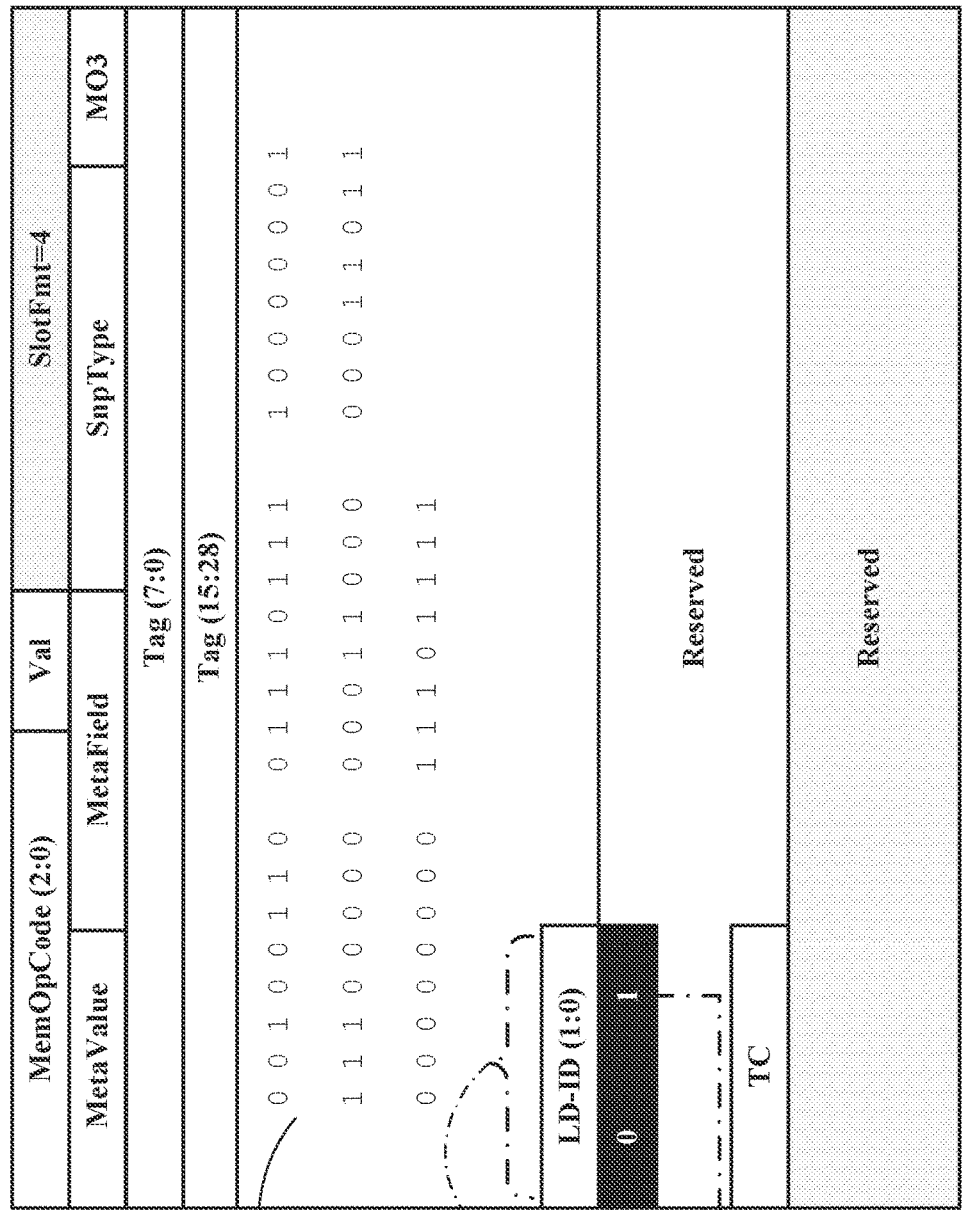
FIG. 5A presents a third exemplary CXL FLIT header according to the present disclosure.

FIG. 5A, presents a third FLIT header 500a according to the present disclosure. It will be noted that the FLIT header 500a is exemplary only, and may not include all the data fields or other elements that may be present in the FLIT header in a CXL host and memory system. (For example, exemplary FLIT header 500a omits a data field for the target memory address.) The FLIT header 500*a* is prepared and sent by the host CPU 107, possibly in conjunction with the CXL Initiator 208.

In FIG. 5A, the FLIT header 500*a* is substantially similar in most respects to the FLIT headers 300*a*, 400*a* of FIGS. 3A and 3B respectively. FLIT header 500*a* includes explicit data 305 which is being sent for writing to DRAM 105. The explicit data 305 is placed there by the host CPU 107. The FLIT header 500*a*, however, does not signal the inclusion of implied data 355. This is because the Write X Enabled field 360 is set to '0'. This opcode of '0' indicates that implied '0's or implied '1's are not being sent.

The value in the Write X data field 365 may be set arbitrarily to '0' or ('1') Either way, the value has no effect on data transmission or content.

Figure 5B:
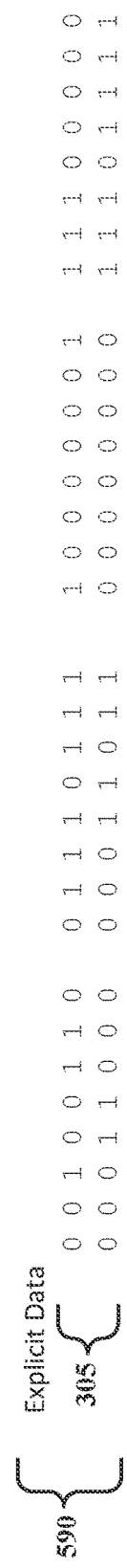
FIG. 5B represents exemplary resulting data which is reconstructed by the central controller of the CXL drive based on the third CXL FLIT header of FIG. 5A.

FIG. 5B represents exemplary resulting data 590 which is received by the central controller 240 of the CXL drive 210. The only values are the explicit data 305 which is the mixed zero/one data that was actually transmitted by the host CPU 107 to the CXL drive 210 across the CXL linker 120. The resulting data full data stream 390 is then stored by the CXL drive 210 in the DRAM 115.

Figure 6:
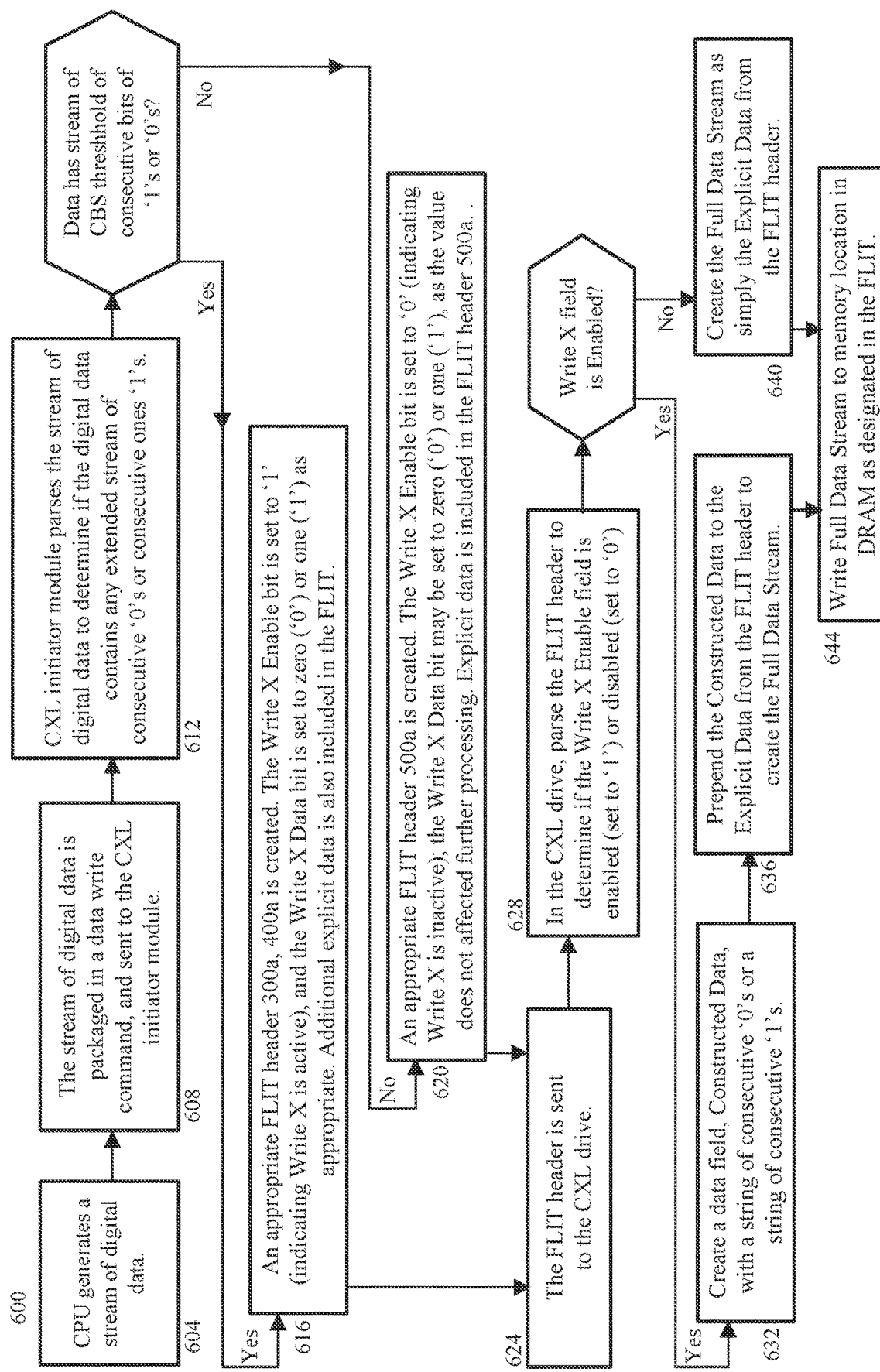
FIG. 6 presents an exemplary method for writing consecutive 'X's to a CXL device, where X='0' or X='1'.

FIG. 6 presents an exemplary method 600 for writing consecutive 'X's to a CXL device, where X='0' or X='1'.

The method 600 begins with operation 604. In operation 604, the CPU 107 generates a stream of digital data 202. The data stream may be generated based on any of a wide variety of data sources well known in the art, including for example and without limitation: data copy operations, data initialization operations (which often entail setting regions of memory to all zeros or all ones), database information, text, audio, video, raw or processed signal data, or the results of calculations. As with all internal computer data, the data string is comprised of an appropriate series of '0's and/or '1's.

In operation 608, the stream of digital data 202 is packaged in a data write command 102W and sent to the CXL initiator module 108.

The CXL initiator module 108 is intended to package the stream of digital data in the form of one or more FLIT headers. However, as a preliminary operation to that, in operation 612 the CXL initiator module parses the stream of digital data 202 to determine if the digital data contains any extended streams of consecutive '0's or extended streams of consecutive '1's.

An "extended stream" means any stream of zeros or ones of greater than a designated bit/byte-threshold-length (BTL), also referred to as a consecutive bit stream threshold value (CBS threshold). The CBS threshold may be defined for example by the length of a block of a memory copy operation or a memory initialization operation. For example, in some embodiments the BTL may be sixteen (16) bytes. Other BTLs (eight bytes, thirty-two bytes, sixty-four bytes, etc.) may be envisioned as well.

If in operation 612 it is determined that the digital data 202 does have an extended stream of zeros or ones, then in operation 616, an appropriate FLIT header 300*a*, 400*a* is created. The Write X Enable bit 360 is set to '1' (indicating Write X is active), and the Write X Data bit is set to '0' or '1' as appropriate. Additional explicit data 305 may also be included in the FLIT.

If in operation 612 it is determined that the digital data 202 does not have an extended stream of zeros or ones, then in operation 620, an appropriate FLIT header 500*a* is created. The Write X Enable bit 360 is set to '0' (indicating Write X is not active), and the Write X Data bit may be set to '0' or '1' (for example, to a default value of '0'), as the value does not affect further processing. Explicit data 305 is included in the FLIT header 500*a*.

Successive to either of operation 616 or 620, the method continues with operation 624 where the FLIT header is sent via the CXL linker 120 to the CXL drive 210.

In the following operation, 628, the CXL CMC parses the FLIT header 300*a*, 400*a*, 500*a* (as applicable) to determine if the Write X Enable field 360 is enabled (set to '1') or disabled (set to '0').

If in operation 628 the Write X Enable field 360 is enabled, the method continues with operation 632. In operation 632, the CXL CMC constructs a data field, Constructed Data 380, with a string of consecutive '0's or a string of consecutive '1's. The number of zeroes or ones in Constructed Data 380 may vary in different embodiments, depending for example on whether the FLIT header 300*a*, 400*a*, 500*a* is a CXL 2.0 header or 3.0 header. In some embodiments, a specific module, for example a Memory Expander module 242, may be programmed (in hardware or via firmware or software) to generate a specific number of bytes of '0's or '1's, such as four bytes, eight bytes, sixteen bytes, or other pre-configured numbers of bytes. In alternative embodiments, the Memory Expander module 242 may itself be programmable to determine how many bytes of '1's or '0's it may generate.

Operation 632 continues with operation 636. In operation 636 the CXL CMC prepends the Constructed Data 380 to the explicit data 305 from the FLIT header to create the Full Data stream 390.

If in operation 628 the Write X Enable field 360 is disabled, the method continues with operation 640. In operation 640, the CXL CMC creates the full data stream 390 based only on the explicit data 305 in the FLIT header. (That is, unlike in operation 628, there is no construction of a constructed data field 380; and therefore, there is no operation comparable to operation 636 of prepending constructed data.)

From either of operations 636 or 640, the method continues with operation 644. In the operation 644, the full data stream 390 is written to the appropriate memory address in the DRAM 115.

The advantages of the present disclosure include: Saving on four slots for data which can be used to pack other read/write requests or write data on the FLIT; increased bandwidth; improved latency; and decreased power consumption.

The present system provides a highly compact and efficient method to send an extended series of '0's or an extended series of '1's from the CPU to the DRAM. As a result, a data field of the FLIT which would otherwise have been required to carry the extended series of '0's or extended series of '1's is, instead, freed for carrying other data, which is typically a CBS threshold of data comprised of a mix of zeros and ones.

In many common uses, it is most likely or most desirable to send an extended string of '0's. Some exemplary, pertinent applications include:

Initialization of Large Data Structures—Common use case in variety of programming languages to ensure memory safety. Some examples—calloc, memset.

Secure Deallocation—Most operating systems zero out newly allocated pages to a process. This ensures malicious processes do not gain access to the data of a process/kernel previously using the memory.

Hypervisor memory allocation—To avoid leaking information among virtual machines (VMs), hypervisor always writes zeroes to host physical memory before assigning it to VM.

Page Migration between DDR Main Memory & CXL Main Memory—There is a significant jump of page migration expected between CXL Memory and Main Memory due to high access latency of CXL Memory. This will increase data copy operations. It is expected a lot of operations in the page being copied would be all 0's or 1's.

Copy-on-Write—Technique where a modification in an operating system page triggers a copy operation to a new physical memory page. It is expected during copy operation a lot of memory operations in the page would be all '0's or '1's.

The present disclosure may be employed with numerous different memory chip designs, numerous bus designs, numerous addressing systems and varied memory location schemas, both logical and hardwired/physical.

Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description, rather than of limitation.

Those skilled in the art will also appreciate that various adaptations and modifications of the preferred and alternative embodiments described above can be configured without departing from the scope of the disclosure. Therefore, it is to be understood that within the scope of the appended claims, the disclosure may be practiced other than as specifically described herein.

For example, various aspects of the present disclosure can be implemented by software, firmware, hardware (including hardware represented by software such as Verilog or hardware description language instructions), or a combination thereof. After reading this description, it will become apparent to a person skilled in the relevant art how to implement the disclosure using other computer systems and/or computer architectures.

It should be noted the simulation, synthesis and/or manufacture of the various embodiments of this disclosure can be accomplished, in part, through the use of computer readable code, including general programming languages (such as C or C++), hardware description languages (HDL) including Verilog HDL, VHDL, Altera HDL (AHDL), or other available programming and/or schematic capture tools (such as circuit capture tools).

This computer readable code may be disposed within or imposed upon any known tangible computer usable/readable storage medium including semiconductor, magnetic disk, optical disk (such as CD-read only memory ROM, DVD-ROM, or the like); and as a computer data signal embodied in a computer usable (e.g., readable) transmission medium (such as a tangible medium including digital, optical, or analog-based medium). As such, the code can be transmitted over communication networks including the Internet and intranets, from one tangible computer readable medium to another. It is understood the functions accomplished, and/or structure provided by the systems and techniques described above, may be represented in a core (such as a graphics processing unit core) that is embodied in program code and may be transformed into hardware as part of the production of integrated circuits.

It is to be appreciated the Detailed Description section, and not the Abstract section, is intended to be used to interpret the claims. The Abstract section may set forth one or more but not all exemplary embodiments of the present disclosure as contemplated by the inventor(s), and thus, is not intended to limit the present disclosure and appended claims in any way.

What is claimed is:

1. A tangible, non-transitory, computer readable storage medium comprising instructions which, when executed by a processor of a memory system, causes the processor to execute a method comprising:
   determining at a central processing unit (CPU) that a binary data stream meant for transmission to a dynamic random access memory (DRAM) contains either one of a consecutive bit stream threshold (CBS threshold) of consecutive zeros or a CBS threshold of consecutive ones; and
   setting a first data flag in a Flow Control UnIT (FLIT) data structure to reflect that the binary data stream contains one of either the CBS threshold consecutive zeroes or CBS threshold consecutive ones;
   wherein a data field of the FLIT is freed for carrying a CBS threshold of data comprised of a mix of zeros and ones.

2. The tangible, non-transitory, computer readable storage medium of claim 1, wherein the method further comprises:
   either setting a second data flag in the FLIT to reflect that the data stream contains the CBS threshold consecutive zeroes or setting the second data flag in the FLIT to reflect that the binary data stream contains the CBS threshold consecutive ones.

3. The tangible, non-transitory, computer readable storage medium of claim 2, wherein the method further comprises:
   receiving, at a dynamic random access memory (DRAM) device, the FLIT; and
   determining at the DRAM device that the first data flag reflects that the binary data stream contains the CBS threshold number of consecutive identical bits.

4. The tangible, non-transitory, computer readable storage medium of claim 3, wherein the method further comprises:
   upon determining at the DRAM device that the first data flag reflects that the binary data stream contains the CBS threshold number of consecutive identical bits, determining from the second data flag that the data stream contains either all zeroes only or contains all ones only.

5. The tangible, non-transitory, computer readable storage medium of claim 4, wherein the method further comprises:
   constructing a data field at the DRAM device, Constructed Data, with a string of consecutive '0's or a string of consecutive '1's, as indicated by the second data flag.

6. The tangible, non-transitory, computer readable storage medium of claim 5, wherein the method further comprises:
   prepending at the DRAM device the Constructed Data to an Explicit Data from the FLIT header to create a Full Data Stream.

7. The tangible, non-transitory, computer readable storage medium of claim 6, wherein the method further comprises:
   writing the Full Data Stream to a memory location in DRAM as designated in the FLIT.

8. A system comprising:
   a host, a host central processing unit (CPU) of the host, and a drive, wherein the host and the drive are coupled via a linker, wherein:

at least one of the CPU and an initiator of the host is configured to:

determine that a binary data stream generated by the CPU and meant for transmission to a dynamic random access memory (DRAM) of the drive contains either one of a consecutive bit stream threshold (CBS threshold) of consecutive zeros or a CBS threshold of consecutive ones; and set a first data flag in a Flow Control UnIT (FLIT) data structure to reflect that the binary data stream the CBS threshold number of consecutive identical bits only;

wherein a data field of the FLIT is freed for carrying a CBS threshold of data comprised of a mix of zeros and ones.

9. The system of claim 8, wherein the at least one of the CPU and the initiator is further configured to:

set a second data flag in the FLIT to reflect that the binary data stream contains consecutive zeroes only or setting the second data flag in the FLIT to reflect that the binary data stream contains consecutive ones only.

10. The system of claim 9, wherein the drive is configured to:

receive the FLIT; and determine that the first data flag reflects that the binary data stream contains the CBS threshold number of consecutive identical bits.

11. The system of claim 10, wherein:

upon determining at the drive that the first data flag reflects that the data stream contains the CBS threshold number of consecutive identical bits, the drive is configured to determine from the second data flag that the data stream contains either only zeroes or only ones.

12. The system of claim 11, wherein:

the drive constructs a Constructed Data with a string of consecutive '0's or a string of consecutive '1's, as indicated by the second data flag.

13. The system of claim 12, wherein the drive prepends the Constructed Data to an Explicit Data from the FLIT header to create a Full Data Stream.

14. The system of claim 13, wherein the drive writes the Full Data Stream to a memory location in DRAM as designated in the FLIT.

* * * * *